United States Patent Office 3,424,025
Patented Jan. 28, 1969

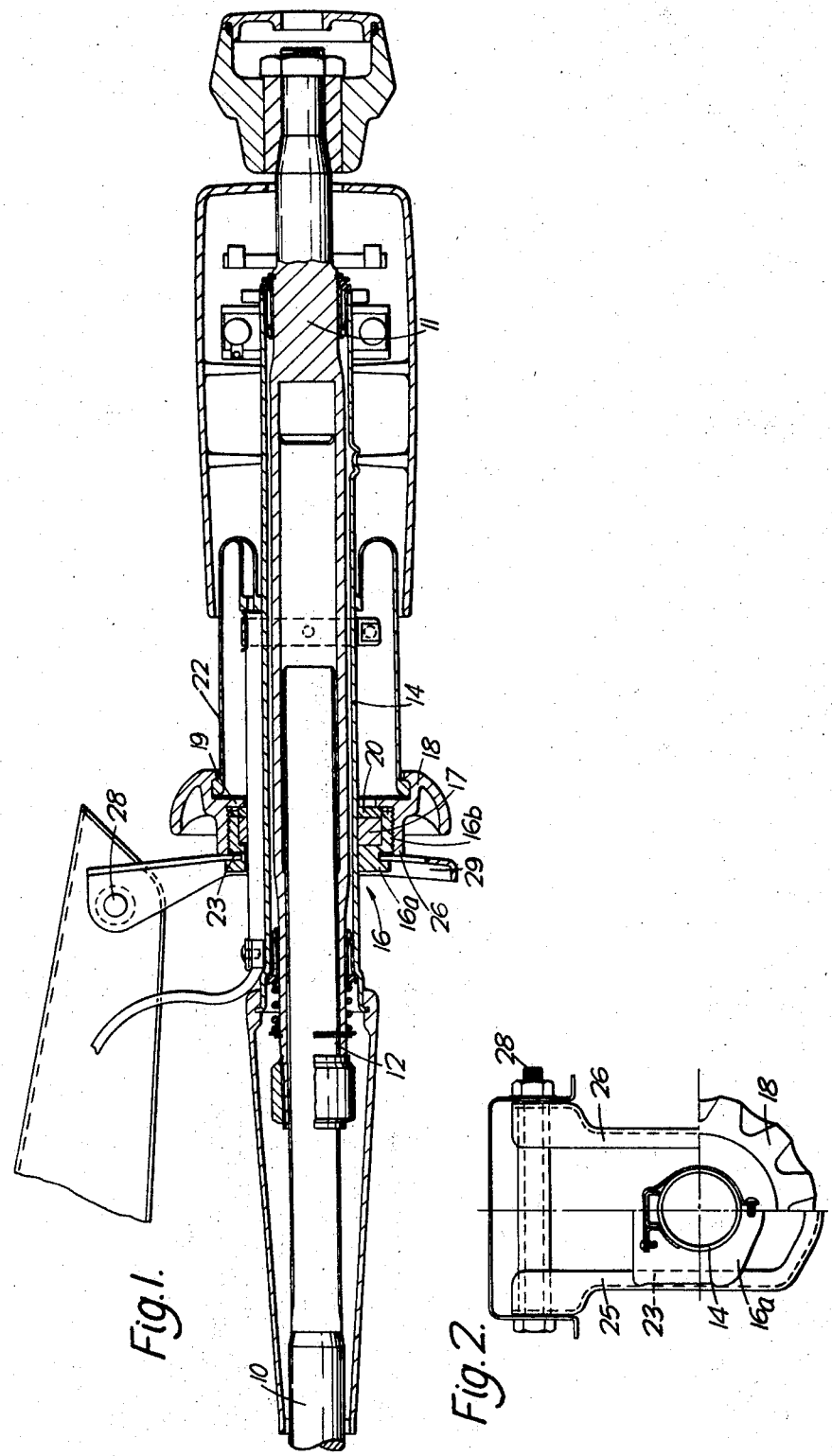

3,424,025
ADJUSTABLE STEERING COLUMN
Stephen James Harper, Stoke, England, assignor to Humber Limited, Stoke, England, a British company
Filed Aug. 14, 1967, Ser. No. 660,385
U.S. Cl. 74—493　　　　　　　　　　　　　　4 Claims
Int. Cl. B62d 1/18

ABSTRACT OF THE DISCLOSURE

Means for clamping a rod, tube, or other elongated member in different positions of lengthwise and transverse adjustment, comprising a cup around the elongated member, resiliently deformable ring (or parts of such a ring) within the cup and surrounding the member, guide means supporting the cup against movement along the member while permitting movement of the cup in at least one transverse direction and screw means operable both to deform the ring into gripping engagement with the member, and also to clamp the ring to the guide means.

---

The invention relates to means for clamping a rod, tube or other elongated member in different positions of lengthwise and transverse adjustment. The means may, for example, be used to clamp an adjustable steering column for a motor vehicle but are not limited to this use.

The invention provides clamping means for the above purpose comprising a cup around the elongated member, a resiliently deformable ring (or parts of such a ring) within the cup and surrounding the member, guide means supporting the cup against movement along the member while permitting movement of the cup in at least one transverse direction and screw means operable both to deform the ring into gripping engagement with the member, and also to clamp the ring to the guide means.

The screw means may, for example, consist of a nut or hand wheel surrounding the cup and in screw-threaded engagement therewith.

In one form of the invention the guide means is a fork or slot within which the cup is slidable, the cup has ledges or other abutment surfaces engageable with one face of the guide means and the screw member engages an opposite face of the guide means to clamp the means against the ledges.

The invention further provides a steering column for a motor vehicle which, for adjustment of the steering wheel position, is both telescopic and also adjustable as to rake by up and down pivotal movement about the lower end of the column and which has, intermediate in the length of the column, clamping means for holding the column in its adjusted positions, comprising a cup around a portion of the column which does not rotate but takes part in telescopic movements, a ring of rubber or other resiliently deformable material within the cup and around the said portion, a fixed slotted or forked guide embracing the cup and extending transversely of the column in an up and down direction, the arms of said guide engaging in grooves in the cup and a nut or screwed handwheel on the cup in screw-threaded engagement therewith, said nut being operable to compress the ring into gripping engagement with the said portion of the column and to clamp the guide against the sides of the grooves.

A specific embodiment of the invention applied to a steering column will now be described with reference to the accompanying drawings in which:

FIGURE 1 is a longitudinal section through the column and showing parts relevant to the invention, and FIGURE 2 is a view, partly in section, in the direction of the arrow.

The column comprises a rotatable shaft constructed in two telescopic parts 10 and 11 splined together at 12, the part 11 carrying a steering wheel, not shown, at its upper end. Around the centre portion of the shaft is a sleeve 14 which supports the shaft, does not rotate but moves with part 11 during telescoping to vary the position of the steering wheel.

Around the sleeve 14 and slidable thereon, is an annular cup 16 having a base 16a and an upstanding peripheral wall 16b. Within the cup there is a ring 17 of natural or artificial rubber or similar resiliently deformable material. Screwed to the outside wall 16b there is a nut or handwheel 18 having an inwardly directed flange or lip 19 which seats on a non-rotatable washer 20 overlying the ring 17. The arrangement is that rotation of the handwheel can be employed to force the washer 20 inwardly of the cup and so to deform the ring into clamping engagement with the sleeve 14. There is a flexible gaiter 22 retained by the handwheel.

The base 16a of the cup has the shape shown in FIGURE 2 and has in its sides a groove 23. The groove receives the two arms 25, 26 of a U-shaped guide 29 which is anchored at 28 to the vehicle body above the steering column. The cup is slidable along the arms 25, 26 to vary the rake of the column by pivotal movement about the lower end 28 of the column.

In order that the column may be held at any chosen rake, the end 26 of the handwheel is arranged to seat on the guide member and, when the handwheel is tightened to deform the ring 17, to clamp the guide member within the slot 23. The column is then also held against telescopic movement.

I claim:

1. Means for clamping an elongated member in different positions of lengthwise and transverse adjustment, comprising a cup around the elongated member, a resiliently deformable ring within the cup and surrounding the member, guide means supporting the cup against movement along the member while permitting movement of the cup in at least one transverse direction and screw means operable both to deform the ring into gripping engagement with the member, and also to clamp the ring to the guide means.

2. Clamping means as claimed in claim 1 in which the screw means consist of a nut surrounding the cup and in screw-threaded engagement therewith.

3. Clamping means as claimed in claim 1 in which the guide means is a slot with in which the cup is slidable, the cup has ledges engageable with one face of the guide means and the screw member engages an opposite face of the guide means to clamp the means against the ledges.

4. A steering column for a motor vehicle which, for adjustment of the steering wheel position, is both telescopic and also adjustable as to rake by up and down pivotal movement about the lower end of the column and which has, intermediate in the length of the column, clamping means for holding the column in its adjusted positions, comprising a cup around a portion of the column which does not rotate but takes part in telescopic movements, a ring of resiliently deformable material within the cup and around the said portion, a fixed slotted guide embracing the cup and extending transversely of the column in an up and down direction, the arms of said guide engaging in grooves in the cup and a nut or screwed handwheel on the cup in screw-threaded engagement therewith, said nut being operable to compress the ring into gripping engagemnt with the said portion of the column and to clamp the guide against the sides of the grooves.

References Cited

UNITED STATES PATENTS

| | | | |
|---|---|---|---|
| 1,520,677 | 12/1924 | Moyse | 74—493 |
| 2,226,656 | 12/1940 | Best | 74—493 |
| 3,185,838 | 5/1965 | Warshawsky. | |

MILTON KAUFMAN, *Primary Examiner.*